March 10, 1925.
J. C. GOURLEY
1,529,428
DELIVERY MECHANISM FOR BOOK COVER MACHINES
Filed Feb. 11, 1924
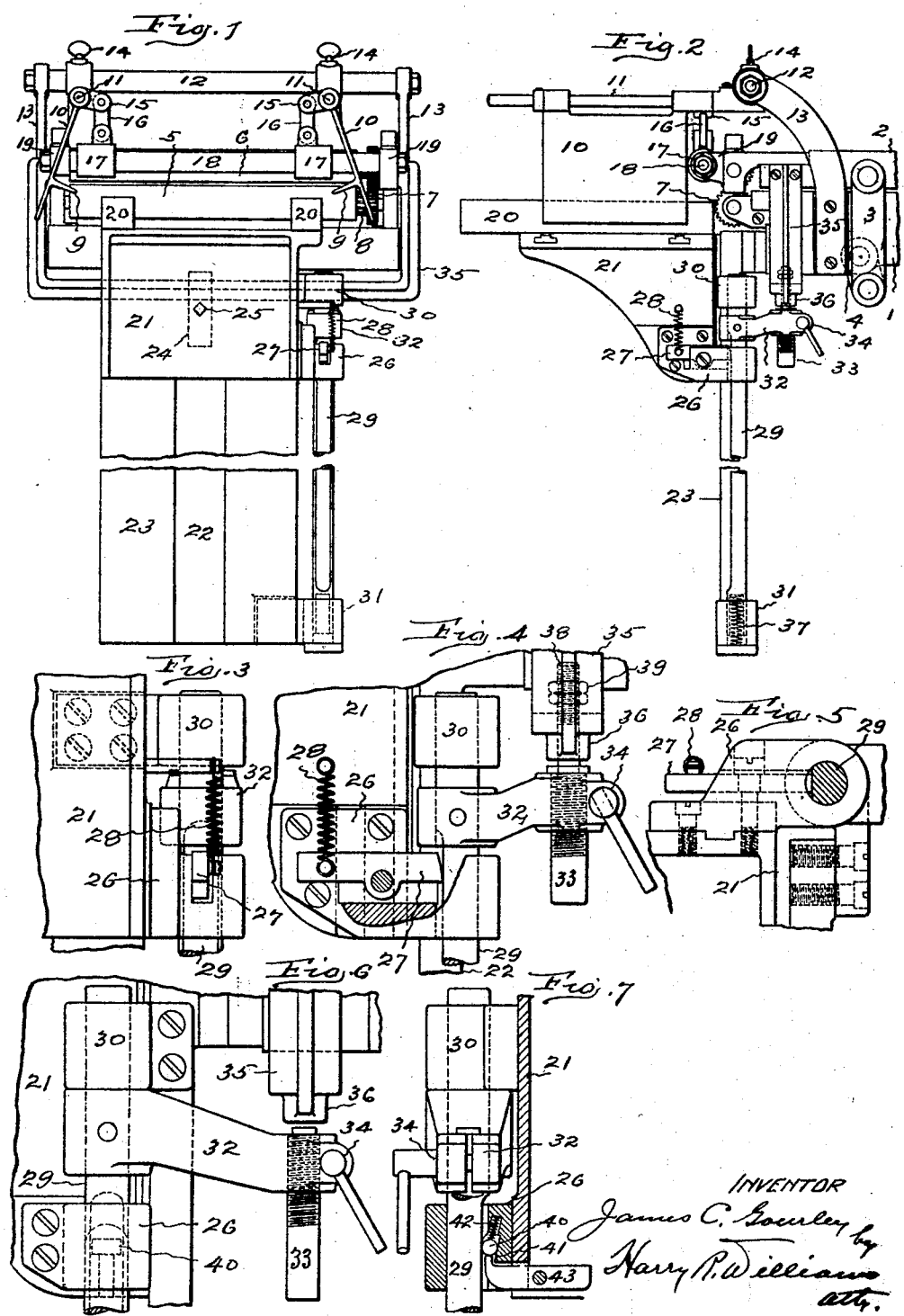

Patented Mar. 10, 1925.

1,529,428

UNITED STATES PATENT OFFICE.

JAMES C. GOURLEY, OF HARTFORD, CONNECTICUT, ASSIGNOR TO THE SMYTH MANUFACTURING COMPANY, OF HARTFORD, CONNECTICUT, A CONNECTICUT STATUTE CORPORATION.

DELIVERY MECHANISM FOR BOOK-COVER MACHINES.

Application filed February 11, 1924. Serial No. 691,867.

*To all whom it may concern:*

Be it known that I, JAMES C. GOURLEY, a citizen of the United States, residing at Hartford, in the county of Hartford and State of Connecticut, have invented a new and useful Improvement in Delivery Mechanism for Book-Cover Machines, of which the following is a specification.

This invention relates to machines for making the covers or cases of books, of the type illustrated in Patent #580,111, April 6, 1897, and more especially to the delivery mechanism, that is, the mechanism which discharges and stacks the cases finished in such machines.

The object of the invention is to facilitate the delivery and ensure the uniform piling of the cases made by the machines of the character referred to.

This object is attained in the mechanism illustrated by pivotally supporting the case guiding and receiving wings at the discharge end of the machine and connecting the wings and the vertically movable case receiving bars with the vertically movable press platen, which carries one of the delivery belts, by such means that when the platen moves down, the guiding and receiving wings are swung outward and drop the case which has been fed to the wings by the delivery belts, onto the receiving bars, and the receiving bars are lowered a distance equal to the thickness of the case dropped upon them from the guiding and receiving wings, the wings being swung inward by the upward movement of the platen and engaging and straightening the cases on the bars, whereby the cases are piled more uniformly and to a better advantage than was possible with the mechanism previously employed for stacking the finished cases.

In the accompanying drawings only as much of the complete case making machine is illustrated as is necessary to show the connection of the present improvement thereto. Fig. 1 shows an end elevation of the platen of the machine, the swinging case guiding and receiving wings, and the vertically movable case receiving bars, with the mechanisms which connect these elements and cause them to operate synchronously for dropping and stacking the finished cases upon the bars, according to this invention. Fig. 2 shows a side elevation of the delivery end of the machine with the mechanisms arranged according to the embodiment of the invention illustrated. Fig. 3 shows on larger scale an end view of the friction clutch connection which feeds the case receiving bars downward when the platen moves down. Fig. 4 is an elevation of the parts shown in Fig. 3 with portion broken away to expose the friction feed pawl. Fig. 5 is a view looking up at the parts shown in Fig. 4. Fig. 6 is a side elevation showing a modification of the feed clutch. Fig. 7 is an edge view with parts broken away of the modified form of clutching means.

The delivery end of the frame 1 of the machine is stationary, and mounted to have a short vertical movement up and down on this end of the frame is the platen 2, the platen being supported by links 3 connected to rocker arms 4. Fig. 2. The finished cases are discharged from this machine when the platen is up, by a belt passing around roll 5 supported by the frame, and a belt passing around roll 6 mounted on the platen, the rolls being connected by gears 7, driven by a sprocket wheel 8. Fig. 1. These parts are old and well known, and forming no novel part of the present invention need no detailed description.

As the finished cases are discharged from the machine they are delivered onto the supporting flanges 9 of the wings 10. The upper edges of the wings are pivotally mounted on rods 11 so that the lower edges of the wings may be swung in and out. These rods are adjustably attached to a bar 12 the ends of which are fastened to the upper ends of curved arms 13 secured to the stationary frame of the machine. By sliding the rods along the bar the wings may be adjusted toward or from each other in order that they may be accommodated to the size of the case being finished by the machine. Thumb screws 14 are provided for clamping the rods and holding the wings in the positions to which they are adjusted. Rocker arms 15 are extended from the hubs of the wings and these arms are connected by links 16 with sleeves 17 that are slidable along a bar 18 the ends of which are fastened to brackets 19 secured to the end of the vertically movable platen. By means of these connections the lower ends of the wings are swung out when the platen moves down and are swung in when the platen moves up. When the wings are in the flanges are in position to support a case and when swung out the case drops from the wing flanges, and as the wings again swing in the lower edges of the wings below the flanges engage the edges of the dropped case and straighten it.

The cases are dropped from the flanges of the wings onto receiving bars 20 which are horizontally adjustable on the bracket 21 so that they may be set toward or from each other according to the size of the case being delivered. This bracket is movable up and down in a dove-tailed way 22 on the front of an apron 23 that extends downward from the end of the machine frame. A spring plate 24 is arranged between the back of the bracket and the front of the apron to provide the required frictional resistance to normally sustain the bracket and bars with a load of cases, the tension of this spring plate being regulated by a set screw 25.

Attached to one side of the bracket near the lower end is a box 26 containing a pivoted pawl or friction clutch member 27, one end of which is preferably formed on an eccentric curve while the other end is drawn up by a spring 28. Fig. 4. The curved end of the pawl is adapted to be engaged by the side of a vertically movable bar 29 that passes through the pawl box and is supported at its upper end by a bearing box 30 and at its lower end by a bearing box 31 secured to the apron. Fastened to this bar is an arm 32 in the outer end of which an adjustable stud 33 is clamped. The stud is screw threaded so that its upper end may be raised and lowered with respect to the arm and the end of the arm is split and provided with a clamp screw 34 for securing the stud in its adjusted position.

The ends of a yoke 35, that extends from side to side beneath the end of the frame, are fastened to the platen so that the yoke moves up and down therewith. On the under side of the yoke is a boss 36 located so as to engage with the stud carried by the arm. When the platen moves down this boss engages the stud and pushes down the arm and vertically movable bar. As the yoke moves down it engages the pawl in such manner as to clutch the parts and carry down the bracket which supports the case receiving bars. When the platen moves up and the boss is carried away from the stud on the arm a spring 37 in a socket in the bearing box at the lower end lifts the bar. During this upward movement the engaging end of the pawl turns up and allows the bar to rise without carrying up the bracket and case receiving bars.

A stem 38 is desirably extended up from the top of the stud carried by the arm, through the yoke, and the upper end of this stem is provided with nuts 39. These nuts are adjusted and locked on the stem in such relation to the yoke that should the spring which lifts the bar fail to function the yoke will engage with the nuts and lift the bar.

Instead of the oscillating friction pawl above described the lower end of the receiving bar supporting bracket may be provided with a roll 40 located in a socket 41 with an inclined wall, as illustrated in Fig. 7, a spring 42 being arranged to normally press the roll toward the lower restricted section of the socket. With this construction on the downward movement of the bar 29 the roll clutches the parts and causes the downward feed of the bracket with the case receiving bars. On the upward movement of the bar the roll rides up in the socket and releases the clutch. A finger 43 may be arranged to engage and lift the roll should it be desirable at any time to lower the receiving bracket and bars by hand.

With this mechanism when the platen moves up the wings are swung in and the case is delivered onto the wing flanges. When the platen moves down the wings are swung apart and the case dropped from the flanges onto the receiving bars and the bars are carried down a distance equal to the thickness of the case. As the platen again moves up the wings are swung in and their lower edges engage the case and square it on the bars. Thus the cases are piled on the bars rapidly, uniformly and neatly in convenient position for removal and future use. The wings in the bars are readily adjustable for different sizes of cases.

The invention claimed is:—

1. The combination with the delivery mechanism of a book case making machine, of pivotally mounted case guiding and receiving wings, vertically movable case supporting bars, and means connecting said wings and bars with a movable part of the delivery mechanism of the machine whereby one movement of said mechanism causes the wings to swing apart and the bars to be lowered and the reverse movement of said mechanism causes the wings to swing toward each other.

2. The combination with the delivery mechanism of a book case making machine, of case guiding and receiving wings mounted on pivotal supports that are adjustable toward and from each other, vertically movable and horizontally adjustable case supporting bars, and means connecting said wings and bars with a movable part of the delivery mechanism of the machine whereby one movement of said mechanism causes the wings to swing apart and the bars to be lowered and the reverse movement of said mechanism causes the wings to swing toward each other.

3. The combination with the delivery mechanism of a book case making machine of pivotally mounted case guiding and receiving wings, means connected between said wings and the delivery mechanism for intermittently oscillating the wings, vertically movable case supporting bars, and means connected between said bars and the delivery mechanism for lowering said bars with a step by step movement.

4. The combination with the delivery mechanism of a book case making machine, of pivotally mounted case guiding and receiving wings, vertically movable case supporting bars, means connecting said wings with a movable part of the delivery mechanism of the machine, and means including a friction clutch connecting said bars with a movable part of the delivery mechanism whereby one movement of said mechanism causes the wings to swing apart and the bars to be lowered and the reverse movement of said mechanism causes the wings to swing toward each other.

5. The combination with the delivery mechanism of a book case making machine, of pivotally mounted case guiding wings provided with case supporting flanges, vertically movable case supporting bars, and means connecting said wings and bars with a movable part of the delivery mechanism of the machine whereby one movement of said mechanism causes the wings to carry said flanges apart and the bars to be lowered and the reverse movement of said mechanism causes said flanges to move toward each other.

6. The combination with the vertically movable platen of a book case making machine, of pivotally mounted case guiding and receiving wings, vertically movable case supporting bars, and means connecting said wings and bars with the platen whereby the downward movements of the platen cause the wings to swing apart and the bars to be lowered and the upward movements of the platen cause the wings to swing toward each other.

7. The combination with the vertically movable platen of a book case making machine, of pivotally mounted case guiding and receiving wings and means connecting said wings with said platen whereby the downward movements of the platen cause the wings to swing apart and the upward movements of the platen cause the wings to swing toward each other.

8. The combination with the vertically movable platen of a book case making machine of case receiving means, a support and guide upon which said receiving means is vertically movable, adjustable means movable upward and downward a limited distance with the platen, and means actuated by the downward movement of said adjustable means for imparting a downward movement to the case receiving means on the support and guide, whereby the reciprocating movements of the platen cause the supporting means to be lowered with a step by step movement.

9. The combination with the vertically movable platen of a book case making machine, of vertically movable case supporting bars, a bar moved downward by the downward movements of the platen, and a friction pawl engaged by said bar whereby the downward movements of said bar through the pawl cause said supporting bars to be lowered with a step by step movement.

10. The combination with the vertically movable platen of a book case making machine, of pivotally mounted case receiving means, vertically movable case supporting means, and mechanism connecting said means with the platen whereby the downward movements of the platen cause the first mentioned means to swing apart and the second mentioned means to be lowered.

JAMES C. GOURLEY.